Dec. 10, 1929. L. SIMMONS ET AL 1,739,082
VENTILATOR
Filed March 14, 1929  2 Sheets-Sheet 2
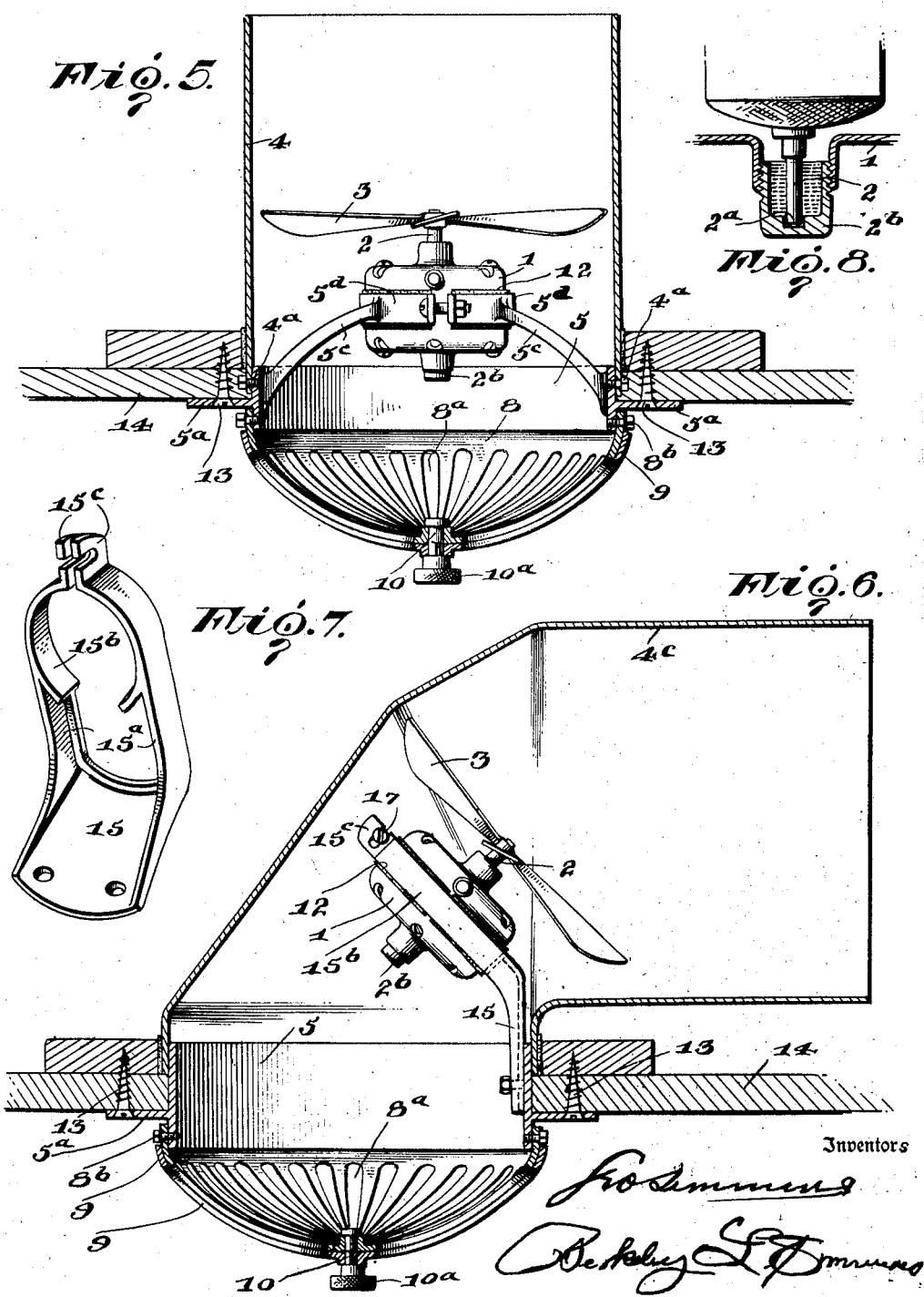

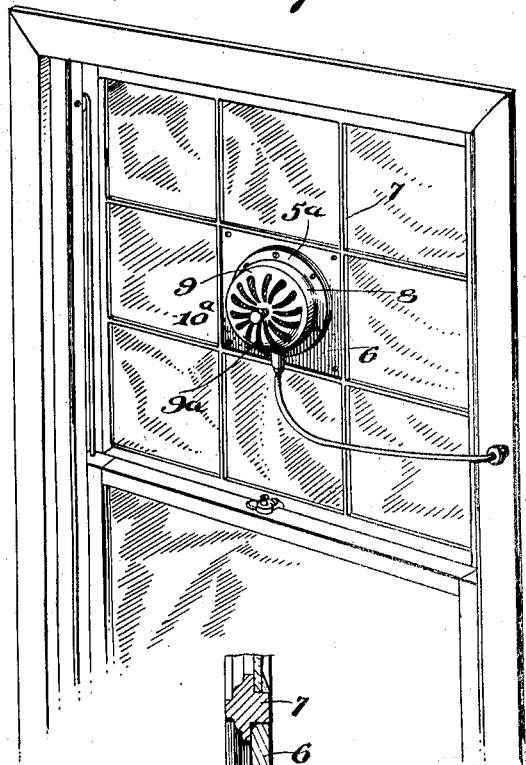
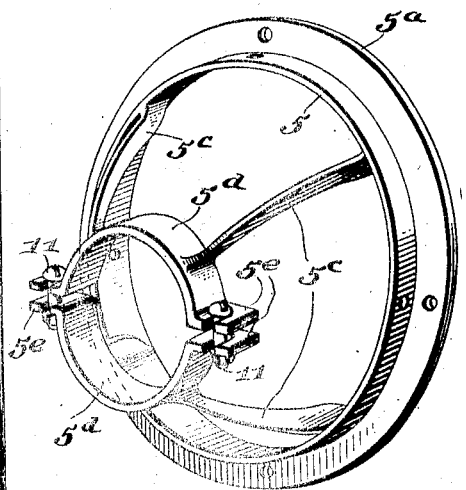
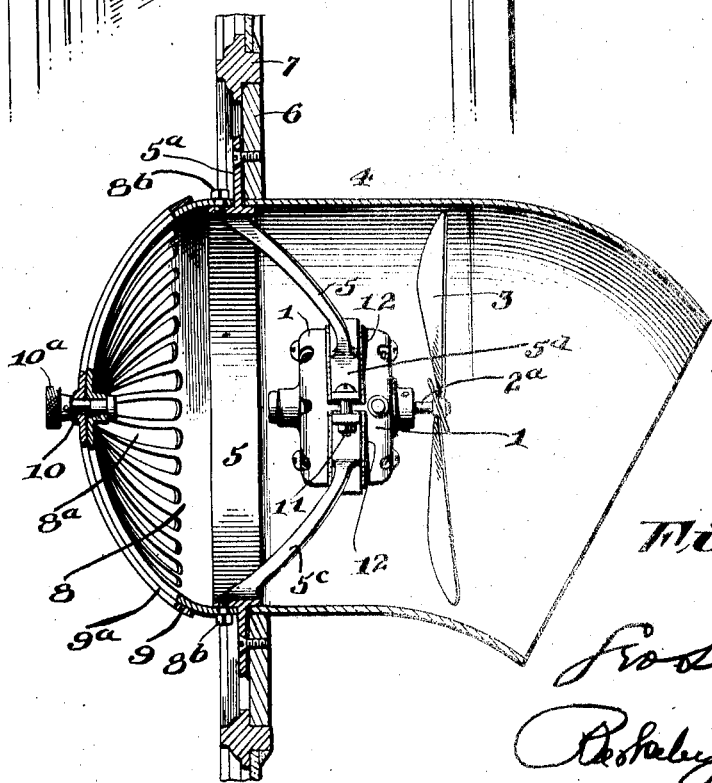

Patented Dec. 10, 1929

1,739,082

UNITED STATES PATENT OFFICE

LEO SIMMONS AND BERKELEY LEO SIMMONS, OF WASHINGTON, DISTRICT OF COLUMBIA

VENTILATOR

Application filed March 14, 1929. Serial No. 347,121.

This invention relates to improvements in ventilators; and the objects and nature of the invention will be understood by those skilled in the art in the light of the following explanations of the accompanying drawings that illustrate what we now believe to be the preferred mechanical expressions or embodiments of our invention from among other forms and arrangements within the spirit and scope thereof.

We have discovered that a small size high speed universal electric motor fitted with an appropriate rotary exhaust fan, when combined with and mounted in an air tunnel or duct bearing certain approximate relations to the fan, attains certain effective and new results as a means for exhausting stagnant air and foul cooking odors from living rooms and kitchens, and hence an object of our invention is to produce an inexpensive small compact ventilating unit particularly for residences, offices, cafes, and such, of remarkably high efficiency and simplicity, and adapted to be driven by alternating or direct electric power circuits.

With the foregoing and other objects in view, our invention consists in certain novel features, and in combinations and arrangements, as more fully and particularly set forth and specified hereinafter.

Referring to the accompanying drawings, forming a part hereof:—

Fig. 1 is a perspective showing an embodiment of our invention mounted in the upper sash of a window.

Fig. 2 shows the ventilator unit of Fig. 1 in vertical longitudinal section.

Fig. 3 is a detail detached perspective of the main frame and motor mounting of said unit.

Fig. 4 is a detached detail perspective of the cushioning means interposed between the motor housing and the clamp supporting the motor.

Fig. 5 is a vertical section through a room ceiling and the unit of Fig. 2 mounted therein and extended therethrough with a straight instead of elbow air pipe or duct.

Fig. 6 is a detail longitudinal section showing the lubricant cup and the end thrust bearing for the armature shaft of the motors shown.

Fig. 7, is a vertical section of a wall or ceiling showing a modified form of the invention mounted therein and extending therethrough.

Fig. 8, is a detail detached perspective of the motor support of Fig. 6.

In the embodiments illustrated, we show a small universal high speed electric motor with enclosed housing 1, and rotary motor shaft 2, at its rear end, carrying and having a concentric air exhausting suction blade rotor such as exhaust fan 3, fixed thereto. The motor shown is approximately two and one-half inches in diameter, and the blades or vanes of its six-inch fan or air exhausting suction blade rotor are so set and of such formation as to attain high suction efficiency, in the combination of the invention, in rapidly withdrawing air or foul odors from a room, when operated at a high speed.

This motor 1, is mounted in normal fixed relation concentrically within an air duct or ventilating exhaust air tunnel duct, or pipe 4, with the exhausting rotor concentrically arranged within said ventilating duct intermediate the length thereof and spaced a substantial distance from the intake end of the duct. Where the diameter of the fan is six inches, the internal diameter of the cylindrical duct or air pipe 4 should not be more than six and one-half inches; according to our developments and findings to date, the maximum internal diameter of the cylinder should be but slightly larger than the exterior diameter of the motor-driven exhausting rotor, to afford only the necessary clearance; as where a six inch air suction rotor is used the air duct should not be more than from eight to ten percent larger.

In the preferred embodiment, the main frame of the unit, embodies a strong, preferably metal, ring or cylindrical annulus 5, having intermediate radial surrounding exterior supporting flange 5ª, fixed to supporting plate 6, which can be inserted and secured in a panel window sash 7, or otherwise, to close the opening in place of a glass or panel. This annulus constitutes the main carrying or supporting frame of the self contained ventilating unit or assembly and also forms the intake end thereof to be located in the room or space to be ventilated.

The ventilating pipe 4 is preferably cylindrical and of substantially uniform diameter throughout its length, and the intake end of this pipe length is exteriorly slipped onto the outer end of the supporting annulus 5 and within the hole cut therefor in supporting plate 6, and is suitably secured to the annulus, so that the annulus supports said pipe by its inner end with the horizontal pipe projecting outwardly from a window or opening, the outer portion of the cylindrical imperforate wall pipe, being deflected downwardly, or of elbow form, to exclude rain, snow, etc. and open at its outer end for free exit of the air exhausted from the room being ventilated.

The supporting annulus constituting the intake end of the ventilating duct is provided with and carries a suitable damper located at the intake side thereof to be accessible within the room to be ventilated, to control or to prevent back draft into the room when the suction rotor is at rest. For instance, among other forms of dampers, in the example shown, the inlet end of the air blast tunnel or pipe is covered by a dome 8, providing transverse slots or openings for the passage of air. In this instance, the openings are in the form of elongated spaced slots, 8$^a$, radiating from the central portion of the dome or crown, and a rotary concavo-convex shutter 9, can be provided slidable on the dome or crown and having corresponding spaced radiating slots 9$^a$, whereby the shutter can be rotated to close or open the air inlet slots of the crown or dome.

In the example shown, the shutter 9, is fixed to and carried by a central rotary spindle 10, having an exposed knurled knob 10$^a$, and at its inner end rotatably mounted and confined in the central portion of the dome. The shutter slidably engages the dome under sufficient friction to maintain the position to which set by knob 10$^a$, and yet the shutter can be easily turned to close or open the air tunnel or duct.

The supporting annulus 5, is formed integral with internal rearwardly and inwardly converging arms 5$^c$, that are more or less resilient, and at their inner ends these arms are rigid with and carry a central split ring clamp, the similar opposing members or jaws 5$^d$, of which are adjustably secured together by nuts and bolts 11, entering parallel ears 5$^e$, projecting radially from jaws 5$^d$. The clamp 5$^d$, 5$^e$, 11, surrounds the motor and, preferably, has a cushioning material lining 12, (Fig. 4) interposed between the inner surfaces of the clamp and the exterior surface of the motor casing. The motor is rigidly secured by contracting the jaws 5$^d$, by the bolts 11. The rearward inclination of arms 5$^c$, and the ring clamp, hold the motor with its longitudinal axis alined with the longitudinal axis of the annulus, while the ring clamp and consequently the motor carried thereby are located in a vertical plane spaced inwardly within the ventilating duct beyond the vertical plane of the annulus 5, at the intake end of the duct, to locate the air exhausting rotor at the required distance within the ventilating duct from its intake end.

The slightly resilient arms 5$^c$, are designed not only to permit opening and closing the ring clamp but also to aid in the absorption of motor vibrations and noise, while the cushioning material 12, also aids in preventing the transmission of vibration and noise.

Fig. 5 shows the ventilating unit of Figs. 1–4, extending through and fitted in a hole cut through ceiling 14, and secured by screws 13, extending through flange 5$^a$, of the annulus 5, into the ceiling, the air blast pipe duct 4, being straight and cylindrical throughout, its length instead of deflected down at its outer end. In Fig. 5, the inner end of pipe 4, slides over the outer end of annulus 5, and can be secured by screws 4$^a$, and also the inner end dome 8, slides over the inner end of annulus 5, and can be secured by screws 8$^b$, all as in Figs. 1 and 2.

In the arrangement of Fig. 5, the motor shaft is vertical and the horizontally rotating fan 3, is fixed on the projecting upper end of said shaft, while the lower end of the shaft (Fig. 8) is upheld by a stop or end thrust bearing 2$^a$, running in lubricant carried by cap 2$^b$, secured to the motor casing, which also applies to the motors of Figs. 1, 2, and 6.

The lower or inlet end of duct 4, (Fig. 5) opens through the ceiling into the room while the upper end of said duct discharges into an offtake space or flue or into the atmosphere space above the ceiling.

In Fig. 6, the annulus 5, as in Fig. 5, is fitted and secured in a vertical hole in the ceiling, while air blast pipe 4$^c$, is of elbow formation to extend vertically in continuation of annulus 5, and then laterally to discharge the air laterally or horizontally through a discharge opening in a vertical wall or otherwise. In this modification, the converging arms 5$^c$, of the annulus are omitted, and the motor is carried by a separate bracket forming a vertical base 15, depending within the annulus 5, and secured thereto by screws 16. The upper portion of the bracket forms a pair of slightly resilient arms 15$^a$, forming the split ring clamp composed of opposing segmental jaws 15$^b$, to surround and tightly clamp the motor 1, as hereinbefore described. The jaws 15$^b$, are tightened on the packing 12, on the motor by clamping nut and bolt 17, connecting ears 15$^c$.

The arms 15$^a$, extend from base 15, at an upward and lateral inclination to hold the fan motor at an angle or inclination corresponding to the angle of the elbow, with the motor shaft longitudinally and centrally arranged in or to the air blast duct, with its exhaust fan on the upper end of the shaft to function as hereinbefore described.

High speed universal motors are produced at comparatively low prices, and by operating same for the purpose named in a close fitting cylinder or pipe, a very small motor will show a much higher result and efficiency than a larger motor without such enclosing arrangement. We have discovered that by equipping such a high-speed small low-cost universal motor with an approximate small exhaust rotor, and combining such electric motor driven rotor with an appropriate air blast duct with the exhausting rotor located therein a substantial distance from the duct intake that receives the air from the room to be ventilated, approximately in the manner hereby disclosed, we attain surprising results, producing a comparatively very low-cost, light-weight, compact, small, economically operating unit. For instance, we find that our unit of the approximate dimensions and small high speed motor hereinbefore described, will do better and more efficient work than the ordinary expensive much larger exhaust motor fan installation.

What we claim is:

1. A ventilating unit for installation to exhaust air from a room or space and discharge at the exterior thereof, said unit including a ventilating air exhaust pipe of substantially uniform interior dimensions throughout its length; a supporting annulus for said pipe constituting the air intake thereto; a damper arranged at the intake side of and carried by said annulus for controlling back draft; an air exhausting suction blade rotor arranged concentrically within said pipe and spaced inwardly thereof from said annulus, clearance being provided between the circumferential exterior of the rotor and the surrounding inner surface of the pipe; and a motor carried by said annulus for driving said rotor.

2. A ventilating unit including a supporting frame providing an annulus; a damper carried by said annulus to control back draft through said intake; means providing a ventilating duct of substantial length and approximate uniform size throughout its length alined with and in continuation of said annulus to receive the air drawn from the room and convey said air to and permit its escape at the exterior of the room; a high-speed air exhausting rotor arranged within said duct and spaced inwardly thereof from said annulus; and a high speed relatively small motor arranged longitudinally of said duct between said rotor and said annulus and carrying and driving said rotor to rapidly exhaust air from the room through said annulus and duct.

3. A ventilating unit including a ventilating pipe; an annulus constituting the main supporting structure of the unit receiving the inlet end of said pipe and by which the pipe is supported in alinement with the annulus, whereby the annulus is arranged at the intake to said pipe from the room to be ventilated; an air exhausting suction blade rotor concentrically arranged within said pipe and spaced a substantial distance from said inlet; a rotor driving motor of relatively small diameter carrying said rotor; and arms carried by said annulus and provided with a support holding said motor centrally and longitudinally arranged within said pipe.

4. A ventilating unit for exhausting air from a room or space and discharging at the exterior thereof, said unit including a ventilating air exhaust pipe; a main supporting annulus for said pipe constituting the air intake thereto; an air exhausting suction blade rotor arranged concentrically within said pipe and spaced a substantial distance inwardly thereof from said annulus, clearance being provided between the circumferential exterior of the rotor and the surrounding inner surface of the pipe; said annulus having substantially resilient arms extending into said pipe and at their inner ends provided with a motor support; and a motor held by said support for driving said rotor.

5. A self-contained compact room ventilating unit including a ventilating pipe; an annulus constituting the main supporting structure of the unit receiving the intake end of said pipe, an air exhausting rotor concentrically arranged within said pipe and spaced inwardly thereof from said intake; a rotor driving motor of relatively small diameter carrying said rotor; and arms carried by said annulus and provided with a central vibration-absorbing and cushioning motor supporting clamp holding said motor within said pipe.

6. In a ventilating unit, in combination, a main supporting annulus; a damper carried by and arranged at the intake side of said annulus for controlling back draft; an air exhausting pipe at its intake end coupled to the annulus and longitudinally alined with and of approximately the same capacity as the intake opening through the annulus; a high-speed air exhausting suction blade rotor longitudinally arranged a distance within said pipe from said annulus intake; and a relatively small high-speed motor carried by said annulus for driving said rotor.

Signed at Washington, D. C., this 12th day of March, 1929.

LEO SIMMONS.
BERKELEY L. SIMMONS.